US011089227B1

(12) United States Patent
James et al.

(10) Patent No.: US 11,089,227 B1
(45) Date of Patent: Aug. 10, 2021

(54) CAMERA WINCH CONTROL FOR DYNAMIC MONITORING

(71) Applicant: X Development LLC, Mountain View, CA (US)

(72) Inventors: Barnaby John James, Los Gatos, CA (US); Tatiana Kichkaylo, Mountain View, CA (US); Peter Kimball, Mountain View, CA (US); Christopher Thornton, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 16/785,252

(22) Filed: Feb. 7, 2020

(51) Int. Cl.
*H04N 5/232* (2006.01)
*G06T 7/50* (2017.01)
*A01K 61/13* (2017.01)
*A01K 29/00* (2006.01)

(52) U.S. Cl.
CPC ......... *H04N 5/23299* (2018.08); *A01K 29/00* (2013.01); *A01K 61/13* (2017.01); *G06T 7/50* (2017.01); *G06T 2207/30232* (2013.01); *G06T 2207/30242* (2013.01)

(58) Field of Classification Search
CPC ...... A01K 61/10; A01K 29/005; A01K 61/85; A01K 63/003; H04N 5/247; H04N 5/23299
See application file for complete search history.

(56) References Cited

U.S. PATENT DOCUMENTS

| 5,823,140 A | 10/1998 | Pittet et al. |
| 2007/0045601 A1* | 3/2007 | Rhee ..................... A01K 79/02 254/383 |
| 2014/0267778 A1* | 9/2014 | Webb .................. H04N 5/2328 348/169 |
| 2018/0263223 A1* | 9/2018 | Kodaira .................... G06T 7/74 |

FOREIGN PATENT DOCUMENTS

| WO | WO 2019/232247 | 12/2019 |
| WO | WO 2020/072438 | 4/2020 |

OTHER PUBLICATIONS

PCT International Search Report and Written Opinion in International Appln. No. PCT/US2021/016387, dated May 3, 2021, 14 pages.

* cited by examiner

*Primary Examiner* — Obafemi O Sosanya
(74) *Attorney, Agent, or Firm* — Fish & Richardson P.C.

(57) ABSTRACT

A method for controlling a sensor subsystem, the method including receiving one or more metrics representing one or more characteristics of livestock, including one or more livestock objects, contained in an enclosure and monitored by one or more sensors coupled to a winch subsystem. The method further includes determining a position to move the one or more sensors based on the metrics and determining an instruction that includes information related to a movement of the one or more sensors. The method further includes sending the instruction to the winch subsystem to change the position of the one or more sensors.

46 Claims, 7 Drawing Sheets ment. For example, the farming of fish can involve raising
CAMERA WINCH CONTROL FOR DYNAMIC MONITORING

FIELD

This specification relates to an automated winch controller for aquaculture systems.

BACKGROUND

Aquaculture involves the farming of aquatic organisms, such as fish, crustaceans, or aquatic plants. In aquaculture, and in contrast to commercial fishing, freshwater and saltwater fish populations are cultivated in controlled environments. For example, the farming of fish can involve raising fish in tanks, fish ponds, or ocean enclosures.

A camera system controlled by a human operator can be used to monitor farmed fish as the fish move throughout their enclosure. When camera systems are manually controlled, human factors, such as the attention span or work schedule of the operator, or the comfort of the human operator in extreme weather conditions, can affect the quality of monitoring.

SUMMARY

The location of livestock, e.g., fish, in an enclosure can change depending on a number of factors, e.g., the presence of food, the temperature of the water, the level of oxygen in the water, or the amount of light. However, biomass monitoring systems that are controlled by human operators can be limited in a number of ways. In one example, an operator may have to sweep a sensor, e.g., a camera, through the enclosure many times to find and confirm a good position at which to monitor the livestock. In other examples, the quality of the sensor data received from human-controlled camera systems can be affected by the operator's attention to the livestock, or by environmental conditions such as the temperature, or the amount of light, precipitation, or surf that may also impact the ability of the operator to operate the sensor. While the term livestock is used to describe the living contents of the enclosure, generally the enclosure can include any type of aquatic cargo such as commercial fish (e.g., salmon, tuna, cod) or plant matter (e.g., seaweed).

To enhance the accuracy of biomass metrics, human operators must also take into account many parameters relating to their monitoring, e.g., the number of fish present in the sensor's range, the distance of the fish from the sensor, what parts of the fish are being monitored, such as the heads or the sides of the fish. Human-controlled biomass monitoring systems may therefore be limited by the ability of the operator to track and synthesize the information provided by the various parameters to determine changes in the sensor position that will result in an ideal viewing position of the sensor.

Accordingly, disclosed is a biomass monitoring system that does not suffer from the deficiencies of prior systems, and that includes a biomass metric generation subsystem that can receive sensor data from a sensor subsystem that includes one or more sensors and generate biomass metrics related to the livestock. A sensor position subsystem can use the biomass metrics to determine a position for the sensor subsystem.

In one general aspect, a method for controlling a sensor subsystem includes receiving one or more metrics representing one or more characteristics of livestock, including one or more livestock objects, contained in an enclosure and monitored by one or more sensors coupled to a winch subsystem. The method further includes determining a position to move the one or more sensors based on the metrics and determining an instruction that includes information related to a movement of the one or more sensors. The method further includes sending the instruction to the winch subsystem to change the position of the one or more sensors.

Implementations may include one or more of the following features. For example, the characteristics of the livestock can include being hungry, sick, hurt, or dead. The one or more metrics can include a number of individual livestock object detections, a number of stereo matched livestock tracks, a median distance to the livestock, a median depth offset of the livestock, a median object track duration of the livestock, or a median livestock track angle.

In some implementations, the method includes receiving sensor data from the one or more sensors and generating, using the sensor data, the one or more metrics.

In some implementations, the method includes receiving, by the winch subsystem, the instructions and changing, by the winch subsystem, the position of the one or more sensors according to the instructions.

In some implementations, the method includes determining an approximate number of livestock objects of the livestock and determining that the approximate number of livestock objects is less than a threshold number of livestock objects. The information of the instruction can relate to a change in position of the one or more sensors from a first depth within the enclosure to a second depth within the enclosure.

In some implementations, the method includes determining a first depth within the enclosure of the one or more sensors and calculating a depth offset value being a difference between the first depth and a reference depth within the enclosure of the one or more sensors. The method can also include determining that the depth offset value is greater than or equal to a threshold depth offset value. The information of the instruction can relate to a change in position of the one or more sensors from the first depth within the enclosure to a second depth within the enclosure.

In some implementations, the method includes determining a median track angle of the livestock, the median track angle corresponding to a median value of one or more angles formed between a track of one or more livestock objects and a horizontal line. The method can further include determining that the median track angle of the livestock is greater than or equal to a threshold track offset value. The information of the instruction can relate to a change in an angle of the winch subsystem from an initial angle to an updated angle.

In some implementations, the method includes determining a median distance from the one or more sensors to the livestock, the median distance corresponding to a median value of each distance from each of the one or more livestock objects to the one or more sensors. The method can further include determining that the median distance is greater than or equal to an upper threshold median distance. The information of the instruction can relate to moving the one or more sensors closer to the livestock.

In some implementations, the method includes determining a median distance from the one or more sensors to the livestock, the median distance corresponding to a median value of each distance from each of the one or more livestock objects to the one or more sensors. The method can further include determining that the median distance is less than or equal to a lower threshold median distance. The information of the instruction can relate to moving the one or more sensors farther from the livestock.

In some implementations, the method includes generating, using the metrics, a belief matrix comprising a plurality of entries each representing a likelihood of livestock being at a certain location within the enclosure. The belief matrix can further include, for each of the likelihoods of the plurality of entries, a confidence score for the likelihood.

In some implementations, the information of the instruction relates to moving the one or more sensors to a particular location within the enclosure that corresponds to a particular entry of the belief matrix the particular location having the greatest likelihood of livestock being present at the particular location compared to other locations within the enclosure.

In some implementations, the one or more sensors include a camera, an IR sensor, a UV sensor, a temperature sensor, a pressure sensor, a hydrophone, a water current sensor, or a water quality sensor such as one that detects oxygen saturation or an amount of a dissolved solid.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

Like reference numbers and designations in the various drawings indicate like elements. The components shown here, their connections and relationships, and their functions, are meant to be exemplary only, and are not meant to limit the implementations described and/or claimed in this document.

DETAILED DESCRIPTION

Figure 1:
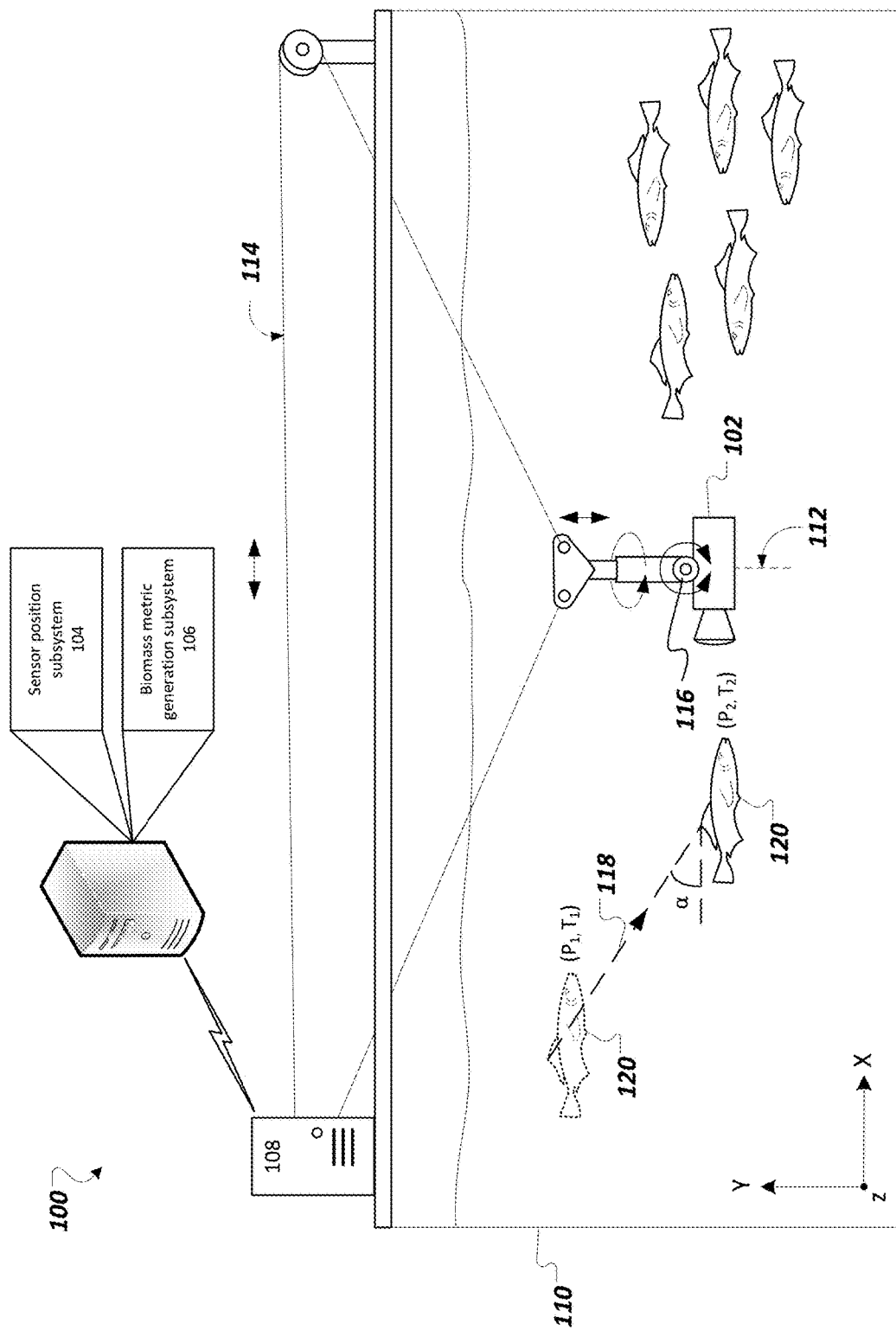
FIG. 1 is a diagram of an example biomass monitoring system and an enclosure that contains aquatic livestock.

FIG. 1 is a diagram of an example biomass monitoring system 100 and an enclosure 110 that contains aquatic livestock. A Cartesian coordinate system is provided for ease of reference. Although FIG. 1 shows the enclosure 110 extending in the xy-plane, the enclosure further extends in the z-direction, with the positive z-direction extending out of the page of the drawing.

The livestock can be aquatic creatures, such as fish 120, which swim freely within the confines of the enclosure 110. In some implementations, the aquatic livestock 104 stored within the structure 102 can include finfish or other aquatic lifeforms. The livestock 104 can include for example, juvenile fish, koi fish, sharks, and bass, to name a few examples.

In addition to the aquatic livestock, the enclosure 110 contains water, e.g., seawater, freshwater, or rainwater, although the enclosure can contain any fluid that is capable of sustaining a habitable environment for the aquatic livestock. The biomass monitoring system 100 includes a sensor subsystem 102, a sensor position subsystem 104, a biomass metric generation subsystem 106, and a winch subsystem 108.

The biomass monitoring system 100 can be used to monitor the aquatic livestock e.g., to determine the health of the aquatic livestock and to maintain habitable living conditions for livestock within the enclosure 110. The sensor position subsystem 104 can store a current position of the sensor subsystem 102 and generate instructions that correspond to a position to which the sensor subsystem is to be moved. In some implementations, the biomass monitoring system 100 is anchored to a structure such as a pier, dock, or buoy instead of being confined within the enclosure 110. For example, instead of being confined within the enclosure 110, the livestock 120 can be free to roam a body of water, and the biomass monitoring system 100 can monitor livestock within a certain area of the body of water.

The winch subsystem 108 receives the instructions and activates one or more motors to move the sensor subsystem 102 to the position corresponding to the instructions. The sensor subsystem 102 generates sensor data corresponding to the enclosure 110 and the aquatic livestock within view of the sensor subsystem. The biomass metric generation subsystem 106 uses the sensor data to generate one or more metrics, which the sensor position subsystem 104 can use to generate an updated instruction. The winch subsystem 108 can receive the updated instruction and move the sensor subsystem 102 to the corresponding position. The sensor position subsystem 104 can generate instructions automatically. That is, the sensor position subsystem 104 does not require a human evaluation or input to determine the suitability of the current position or the next position of the sensor subsystem 102.

The sensor subsystem 102 can include one or more sensors that can monitor the livestock. The sensor system 229 is waterproof and can withstand the effects of external forces, such as typical ocean currents, without breaking. The sensor subsystem 102 can include one or more sensors that acquire sensor data, e.g., images and video footage, thermal imaging, heat signatures, according to the types of sensor of the sensor subsystem. For example, the sensor subsystem 102 can include one or more of the following sensors: a camera, an IR sensor, a UV sensor, a heat sensor, a pressure sensor, a hydrophone, a water current sensor, or a water quality sensor such as one that detects oxygen saturation or an amount of a dissolved solid.

The biomass monitoring system 100 can additionally store the sensor data captured by the sensor subsystem 102 in a sensor data storage. In some implementations, the biomass monitoring system can store media, such as video and images, as well as sensor data, such as ultrasound data, thermal data, and pressure data, to name a few examples. Additionally, the sensor data can include GPS information corresponding to a geolocation at which the sensor subsystem captured the sensor data.

One or both of the sensor subsystem 102 and the winch subsystem 108 can include inertial measurement devices for tracking motion and determining portion of the sensor subsystem, such as accelerometers, gyroscopes, and magnetometers. The winch subsystem 108 can also keep track of the amount of cord 114 that has been spooled out and reeled in, to provide another input for estimating the position of the sensor system 102. In some implementations the winch subsystem 108 can also provide torques applied to the cord, to provide input on the position and status of the sensor subsystem 102. In some implementations, the sensor subsystem 102 can be attached to an autonomous underwater vehicle (AUV), e.g., a tethered AUV.

In the example of FIG. 1, the sensor subsystem 102 includes a camera which is fully submerged in the enclosure 110, although in other embodiments, the sensor subsystem can acquire sensor data without completely submerging the sensor subsystem, e.g., while the sensor subsystem is suspended above the water. The position of the sensor subsystem 102 within the enclosure 110 is determined by instructions generated by the sensor position subsystem 104.

The sensor position subsystem 104 can include one or more computers that generate an instruction corresponding to an x, y, and z-coordinate within the enclosure 110. The instruction can also correspond to a rotation about an axis of rotation 112 of the biomass monitoring system 100, the axis of rotation being coextensive with a portion of a cord 114 that extends substantially in the y-direction. Such a rotation changes a horizontal angle of the sensor subsystem 102, the horizontal angle being an angle within the xz-plane at which the sensor subsystem receives sensor input. The instruction can also correspond to a rotation about a pin 116 that connects the sensor subsystem to components of the winch subsystem 108. Such a rotation changes a vertical angle of the sensor subsystem, the vertical angle being measured with respect to the positive y-axis.

The instruction can describe a possible position, horizontal angle, and vertical angle of the sensor subsystem 102 within the enclosure 110. For example, the sensor position subsystem 104 can determine an instruction based on one or more metrics received from the biomass metric generation subsystem 106.

In some implementations, the sensor position subsystem 104 can be communicatively coupled to a computer that can present the sensor data to a caretaker of the aquatic livestock who can observe the livestock and the enclosure 110. The sensor position subsystem 104 can communicate the instruction to the winch subsystem 108.

The winch subsystem 108 can include one or more motors, one or more power supplies, and one or more pulleys to which the cord 114, which suspends the sensor subsystem 102, is attached. A pulley is a simple machine used to support movement and direction of a cord, such as cord 114. Although the winch system 108 includes a single cord 114, any configuration of one or more cords and one or more pulleys that allows the sensor subsystem 102 to move and rotate, as described herein, can be used.

The winch subsystem 108 receives an instruction from the sensor position subsystem 104 and activates the one or more motors to move the cord 114. The cord 114, and the attached sensor subsystem 102, can be moved along the x, y, and z-directions, to a position corresponding to the instruction. A motor of the winch subsystem 108 can be used to rotate the sensor subsystem 102 to adjust the horizontal angle and the vertical angle of the sensor subsystem. A power supply can power the individual components of the winch subsystem. The power supply can provide AC and DC power to each of the components at varying voltage and current levels. In some implementations, the winch subsystem can include multiple winches or multiple motors to allow motion in the x, y, and z-directions.

The sensor position subsystem 104 is communicatively coupled to the biomass metric generation subsystem 106, allowing the subsystem 106 to receive sensor data. The biomass metric generation subsystem 106 can use the sensor data to generate various biomass metrics. For example, for enclosure 110 that contains fish 120, the metrics that the biomass metric generation subsystem can generate include a number of fish present within the sensor's range, an approximate distance of the fish to the sensor, an offset distance of the fish from a horizontal line formed by the sensor's lens, and an angle of the fish body relative to a plane formed by the front face of the sensor.

The biomass metric generation subsystem 106 can send one or more of the biomass metrics to the sensor position subsystem 104, which can use them to generate an updated instruction. That is, the sensor position subsystem 104 can use the received metrics to dynamically update the position of the sensor subsystem 102, e.g., so that the winch subsystem 108 moves the sensor subsystem to an ideal position for generating sensor data.

FIG. 1 shows two positions of the same fish, fish 120, at two different times, $T_1$ and $T_2$. At times $T_1$ and $T_2$ the fish is at positions $P_1$ and $P_2$, respectively. The fish 120 moves from position $P_1$, where it is outlined with dotted lines, to position $P_2$. A track 118 shows the direction in which the fish 120 moved with an arrow indicating the direction of movement from position $P_1$ to position $P_2$. The biomass metric generation subsystem 106 can generate information that describes the track 118 by monitoring one or more certain points along one or more fish over a certain timeframe. As shown with respect to FIG. 1, the biomass metric generation subsystem 106 monitors a top fin of the fish 120 to generate the information describing track 118, although other points of an individual livestock object can be used to generate track information, such as an eye, tail, or snout of the livestock object.

FIG. 1 also shows a track angle, $\alpha$, that is measured from a horizontal line, parallel to the x-axis, to the track 118. The biomass metric generation subsystem 106 can generate information that describes the track angle of an individual livestock object using track information of the livestock object. While FIG. 1 shows an acute track angle, in some implementations, the biomass metric generation subsystem 106 can generate information corresponding to an obtuse track angle, which is equal to $180°-\alpha$. The biomass metric generation subsystem 106 can generate track information and track angle information for each individual livestock object present in the field of view of the sensor subsystem 102.

Figure 2:
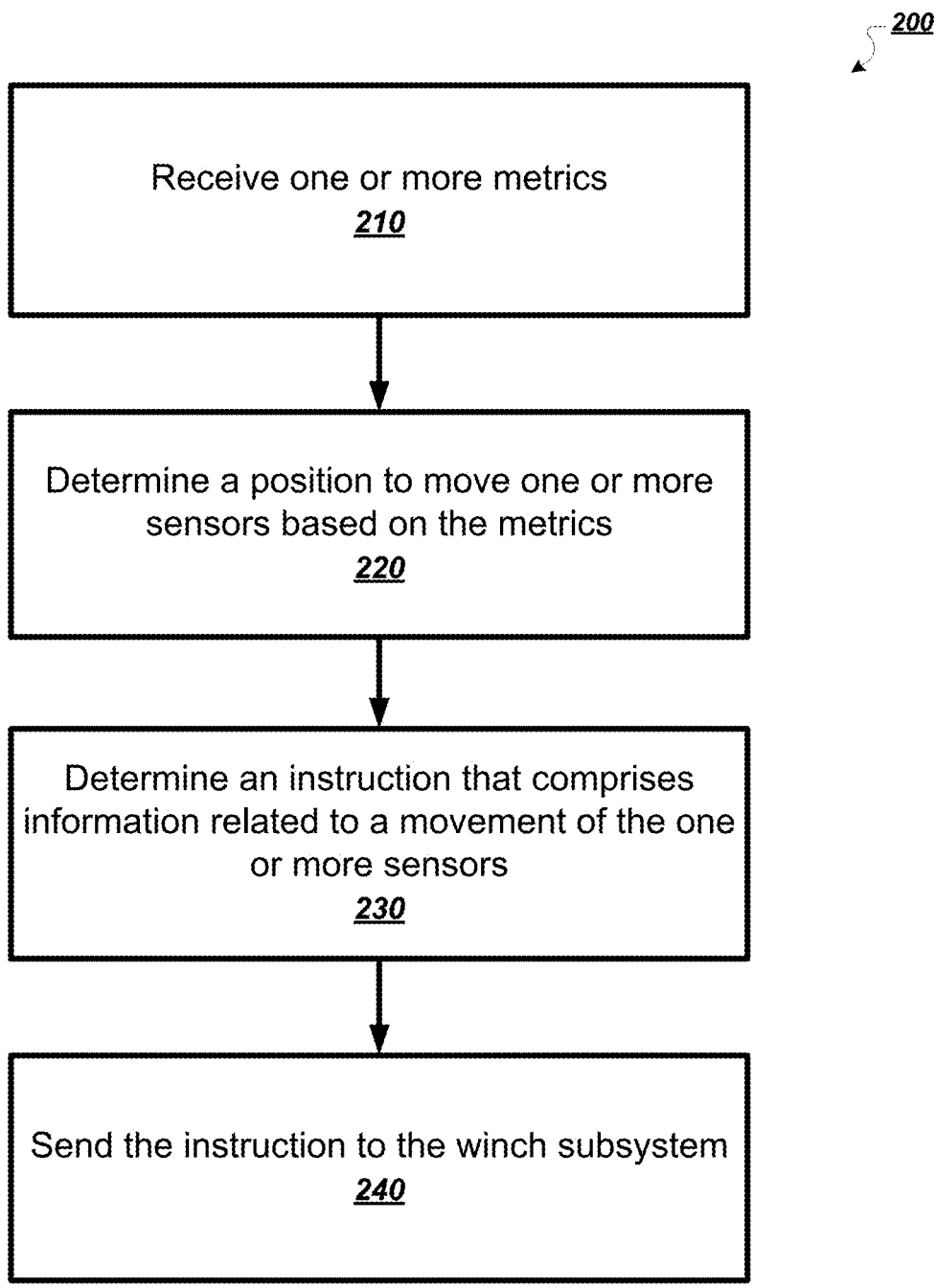
FIG. 2 is a flow diagram for an example process of changing a position of a sensor subsystem, of the biomass monitoring system of FIG. 1, including one or more sensors.

FIG. 2 is a flow diagram for an example process of changing a position of a sensor subsystem, of a biomass monitoring system, including one or more sensors. The example process will be described as being performed by a biomass monitoring system of one or more computers programmed in accordance with this specification. For example, the biomass monitoring system 100 can perform the example process.

The biomass monitoring system receives one or more metrics representing one or more characteristics of livestock contained in an enclosure and monitored by one or more sensors coupled to a winch subsystem (210). The one or more sensors are part of a sensor subsystem. The metrics can be generated by a biomass metric generation subsystem communicatively coupled to a sensor position subsystem. The biomass metric generation subsystem can store the generated metrics in a data storage. The biomass metric generation subsystem can periodically generate a new value for each of the one or more metrics and can update the value of the one or more metrics in the data storage following each new value that is generated. The biomass metric generation subsystem can generate a value for a metric every minute or more, every ten minutes or more, or every hour or more, to name a few examples.

As an example, one of the generated biomass metrics can be a number of individual livestock objects, e.g., individual fish of the livestock contained in the enclosure, that are detected within a certain amount of time. The biomass metric generation subsystem can detect the livestock objects using any suitable method of image recognition e.g., using a machine-learned image recognition model or other computer program that compares the color, size, or shape of the individual livestock objects detected against a reference image of livestock objects.

As another example, one of the generated biomass metrics can be a median object track duration of the livestock. The biomass metrics generation subsystem can determine an object track duration for a livestock object. The track duration for a livestock object is an amount of time that it takes for the livestock object to move between different positions. For example, referring to FIG. 1, the track duration for a livestock object can be a change in time between when the livestock object was at position $P_2$ and when the livestock object was at position $P_1$, e.g., $T_2-T_1$. The biomass metrics generation subsystem can determine a median track duration from the track durations determined for each of multiple livestock objects. That is, the median track duration metric represents a median track duration of multiple track durations each determined for a different livestock object.

As another example, one of the generated biomass metrics can be a median livestock track angle. The biomass metrics generation subsystem can determine an object track angle for a livestock object, as described above. The biomass metrics generation subsystem can determine a median livestock track angle from the livestock track angle determined for each of multiple livestock objects. That is, the median livestock track angle metric represents a median livestock track angle of multiple livestock track angles each determined for a different livestock object.

As yet another example, one of the generated biomass metrics can be a number of stereo matched livestock tracks. For embodiments that include a sensor subsystem having multiple sensors, e.g., multiple cameras, the biomass metric generation subsystem can generate the stereo matched livestock tracks metric using sensor data from each of the multiple sensors. Using the sensor data from each of the multiple sensors, the biomass metric generation subsystem can generate track information for one or more livestock objects.

The stereo matched livestock track metric can indicate a number of individual livestock objects that are within a certain range of each of the multiple sensors. For example, each of multiple cameras can provide sensor data to the biomass metric generation subsystem, which can generate separate track information for one or more livestock objects using the sensor data received by each of the multiple cameras. Depending on the viewpoints of the multiple cameras, the track information corresponding to each camera may be different. For example a first camera may capture a full track duration as a fish moves between two positions, while a second camera may capture a fraction of the full track duration. Using track information (e.g., the intersection of the duration where the livestock object is visible in the view of each of the one or more cameras) and information related to the position or viewing angle of the multiple cameras, the stereo matched livestock track metric can be used to estimate a distance of the fish to the sensor sub system.

As another example, if the biomass metric generation subsystem determines that a fish or a fish track is present in the view of one of the sensors but not present in the view or views of the other sensor or sensors, the sensor position subsystem can use this information to estimate a distance of the fish to the sensor subsystem or determine that the fish is less than or equal to a stereo horopter minimum distance of the sensor subsystem.

As another example, if the biomass generation subsystem determines that a fish is present in the view or views of the one or more sensors of the sensor subsystem, but the sensor position subsystem is not able to discern certain features of the fish when the biomass metric generation subsystem is monitoring certain features to generate track information (e.g., features such as the head or tail of the fish or other livestock object), then the sensor position subsystem can estimate the distance of the fish to the sensor subsystem or determine from the stereo matched livestock track metric that the sensor subsystem is greater than or equal to an upper threshold distance to the sensor subsystem.

As yet another example, one of the generated biomass metrics can be a median horizontal distance to the livestock. For example, the biomass metrics generation subsystem can determine a horizontal distance that represents a distance from the sensor subsystem to an individual livestock object, as measured in a direction perpendicular to the y-direction. The biomass metrics generation subsystem can determine a median horizontal distance from the horizontal distance determined for each of multiple livestock objects. That is, the median horizontal distance metric represents a median distance of multiple distances for a corresponding number of livestock objects.

As another example, one of the generated biomass metrics can be a median depth offset of the livestock. The sensor subsystem can be positioned in a certain depth above or below sea level within a plane of the sensor subsystem that is perpendicular to the xz-plane. The biomass metrics generation subsystem can determine a depth offset that represents a vertical distance from the plane of the sensor subsystem to an individual livestock object, as measured in the y-direction. The biomass metrics generation subsystem can determine a median depth offset from the depth offset determined for each of multiple livestock objects. That is, the median depth offset metric represents a median depth offset of multiple depth offsets for a corresponding number of livestock objects.

The system determines a position to move the one or more sensors based on the metrics (220). For example, the system can determine that the depth, or vertical position, of the sensor subsystem, e.g., its position in the y-direction with respect to FIG. 1, should likely be adjusted based on the individual livestock object detected metric or the median depth offset metric. As another example, the system can determine that the horizontal position of the sensor subsystem, e.g., its position in the x or z-directions, should likely be adjusted based on the median horizontal distance metric or the median object track duration metric. As yet another example, the system can determine that a horizontal angle of the sensor subsystem, as measured in the xz-plane, or a vertical angle measured from the positive y-axis, should likely be adjusted based on the stereo matched livestock track metric or the median livestock track angle metric.

The system determines an instruction that includes information related to a movement of the one or more sensors (230). The instruction can be encoded in a way that is readable by the winch subsystem, to which the sensor subsystem and one or more sensors are coupled. For example, the instruction can be an instruction to change the vertical position of the sensor subsystem, e.g., to increase the depth of the sensor subsystem. The instruction can be generated by a sensor position subsystem of the biomass monitoring subsystem that receives information related to the position of the one or more sensors from the biomass metric generation subsystem.

As another example, the sensor position subsystem can describe the instruction in terms of an (x, y, z) position within the enclosure to which the sensor subsystem is to be moved, a horizontal angle, $\varphi$, measured in the xz-plane, and a vertical angle, $\theta$, measured with respect to the z-axis. In other examples, the instruction can be in terms of a movement in the x, y, or z-directions such as move 10 feet in the horizontal direction (x), move 20 feet below sea level in the vertical direction (y), move 15 feet in an orthogonal horizontal direction (z), rotate 30° (e.g., clockwise) in the xz-plane, and rotate 45° e.g., downwards from the positive z-axis.

An example scheme for describing the current position and angle of sensor subsystem or the next position and angle of the sensor subsystem is described, although other schemes can be used. For example, the sensor position subsystem can communicate position and sensor information using a combination of Cartesian and polar coordinates or a combination of Cartesian and cylindrical coordinates.

The system sends the instruction to the winch subsystem to change the position of the one or more sensors (240). The sensor position subsystem can generate the instruction and communicate it to the winch subsystem, which carries out the instruction, e.g., by changing the x, y, and/or z-position of the sensor subsystem and/or the horizontal angle or vertical angle of the sensor subsystem.

In some implementations, the biomass metric generation subsystem can use the one or more metrics to generate a belief matrix for the enclosure. The belief matrix can partition the enclosure into discrete portions, each portion having a probability assigned to it representing the likelihood that one or more individual livestock items are present in the space defined by the portion. For example, the belief matrix can represent a likelihood of livestock being at a certain location within the enclosure and the likelihood associated with a certain location can be expressed as an entry in the belief matrix.

In some implementations, a belief matrix can be a 3-dimensional matrix with entries corresponding to x, y, and z values for portions of the enclosure. In some implementations, a belief matrix can be a 4-dimensional matrix with entries corresponding to x, y, and z values for portions of the enclosure and a time value for when the probabilities of the belief matrix was calculated.

In some implementations, the enclosure is radially symmetric (e.g., a cylindrical enclosure) and a belief matrix can partition the enclosure into discrete portions with respect to a center point of the enclosure. For example, a belief matrix can be a 3-dimensional matrix with entries corresponding to radial distance from the center point, depth (e.g., as measured in the y-direction), and time.

In some implementations, the entries in the belief matrix can represent an estimate of the number of livestock objects at a particular location in the enclosure. In some implementations, the entries in the belief matrix can represent an estimate of the number of livestock objects and a confidence associated with the estimate. In some implementations, the entries in the belief matrix can represent an estimate of the number of livestock objects belonging to a particular category of livestock objects at a particular location in the enclosure. For example, an entry in the belief matrix can represent an estimate of the number of sick fish at a particular location in the enclosure, a number of mature fish at a particular location in the enclosure, or a number of runts (e.g., smaller than average livestock objects) at a particular location in the enclosure. In some implementations, the biomass monitoring system can monitor behaviors of the livestock objects, e.g., behaviors such as what depth the livestock objects tend to be located at certain times of the day, during certain seasons, or under certain environmental conditions. In some implementations, the belief matrix can include information related to behaviors of the livestock objects.

The biomass metrics generation subsystem can maintain a belief matrix for each of multiple hours of multiple days. For example, the biomass metrics generation subsystem can generate a belief matrix each hour of a day and store the belief matrix in a data storage. The biomass metrics generation subsystem can store an hourly belief matrix for multiple days.

In some implementations, the sensor position system can use a previously-generated belief matrix to determine a position for the sensor subsystem. For example, if the biomass metrics generation subsystem detects a low count of individual livestock objects, the sensor position subsystem can determine an instruction to move the sensor subsystem to a location of the enclosure corresponding to a location with a high likelihood of livestock according to a previously-generated belief matrix. In some implementations, the sensor position system can use the confidence values of the belief matrix to determine a position for the sensor subsystem to improve the quality of collected data.

Figure 3:
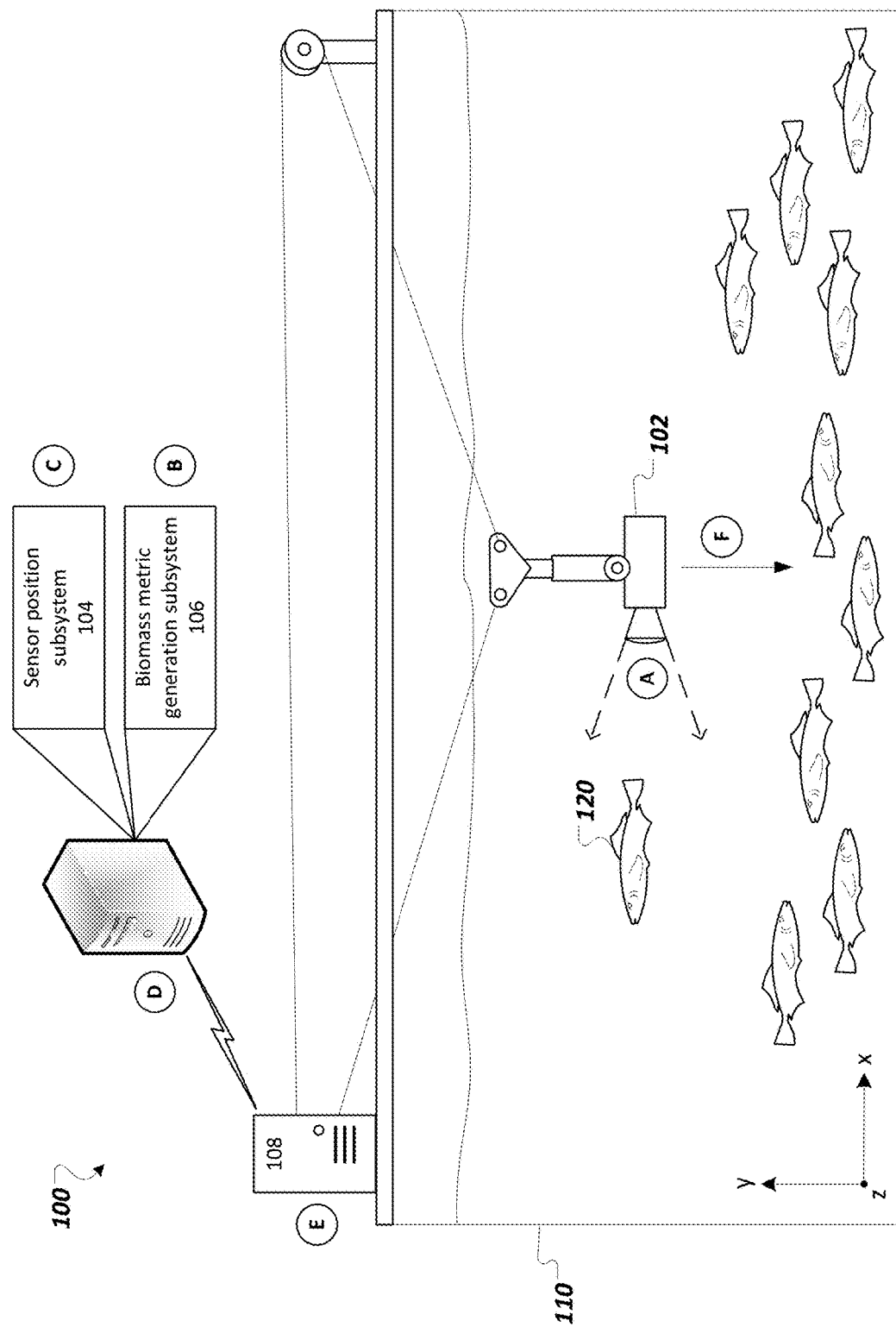
FIG. 3 is a diagram that illustrates a position change of the sensor subsystem of FIG. 2 to address a scenario in which low or no livestock is detected.

FIG. 3 is a diagram that illustrates a position change of the sensor subsystem 102 to address a scenario in which low or no livestock is detected. In the example of FIG. 3, the sensor subsystem 102 includes a camera which generates visual sensor data (A).

The sensor data is communicated to the biomass metric generation subsystem 106, which generates one or more metrics using the sensor data (B). For example, one of the metrics generated by the biomass metric generation subsystem 106 can be a number of individual fish detected within a certain amount of time. In this example, only one fish, fish 120, is detected, leading to a low individual fish detected metric.

The one or more metrics generated in stage (B) are communicated to the sensor position subsystem 104, which determines, using the metrics, that low livestock is detected (C). For example, the sensor position subsystem 104 can compare the actual number of fish detected metric generated in stage (B) to a threshold value for the metric. If the actual number of fish detected metric is less than the threshold number of fish detected metric, then the sensor position subsystem 104 can determine that low livestock is detected and that an instruction to move the sensor subsystem 102 is to be generated.

The sensor position subsystem 104 determines an instruction corresponding to a movement of the sensor subsystem 102 and communicates the instruction to the winch subsystem 108 (D). In the example of FIG. 3, the instruction is for changing the vertical position, or depth, of the sensor subsystem 102 in response to the low livestock detected.

The winch subsystem 108 receives the instruction from the sensor control subsystem 104 and activates one or more motors to perform the instruction (E). The sensor subsystem 102 descends in the y-direction (F). As shown in FIG. 3, the livestock is mainly located towards the floor of the enclosure 110, therefore, lowering the sensor subsystem 102 allows the sensor subsystem to better generate sensor data of the livestock.

In some implementations, during stage (D), the sensor position subsystem can use a previously-generated belief matrix to determine the instruction. For example, the sensor position subsystem can use a belief matrix generated for the day before the current day to determine a particular location within the enclosure where there is likely to be at least a minimum number of fish. The instruction can relate to moving the sensor subsystem to the particular location within the enclosure. As another example, the sensor position subsystem can use a belief matrix generated one year prior to the current day. As yet another example, the sensor position subsystem can use a belief matrix generated on a day having similar atmospheric or weather conditions as the current day to determine the instructions.

Figure 4:
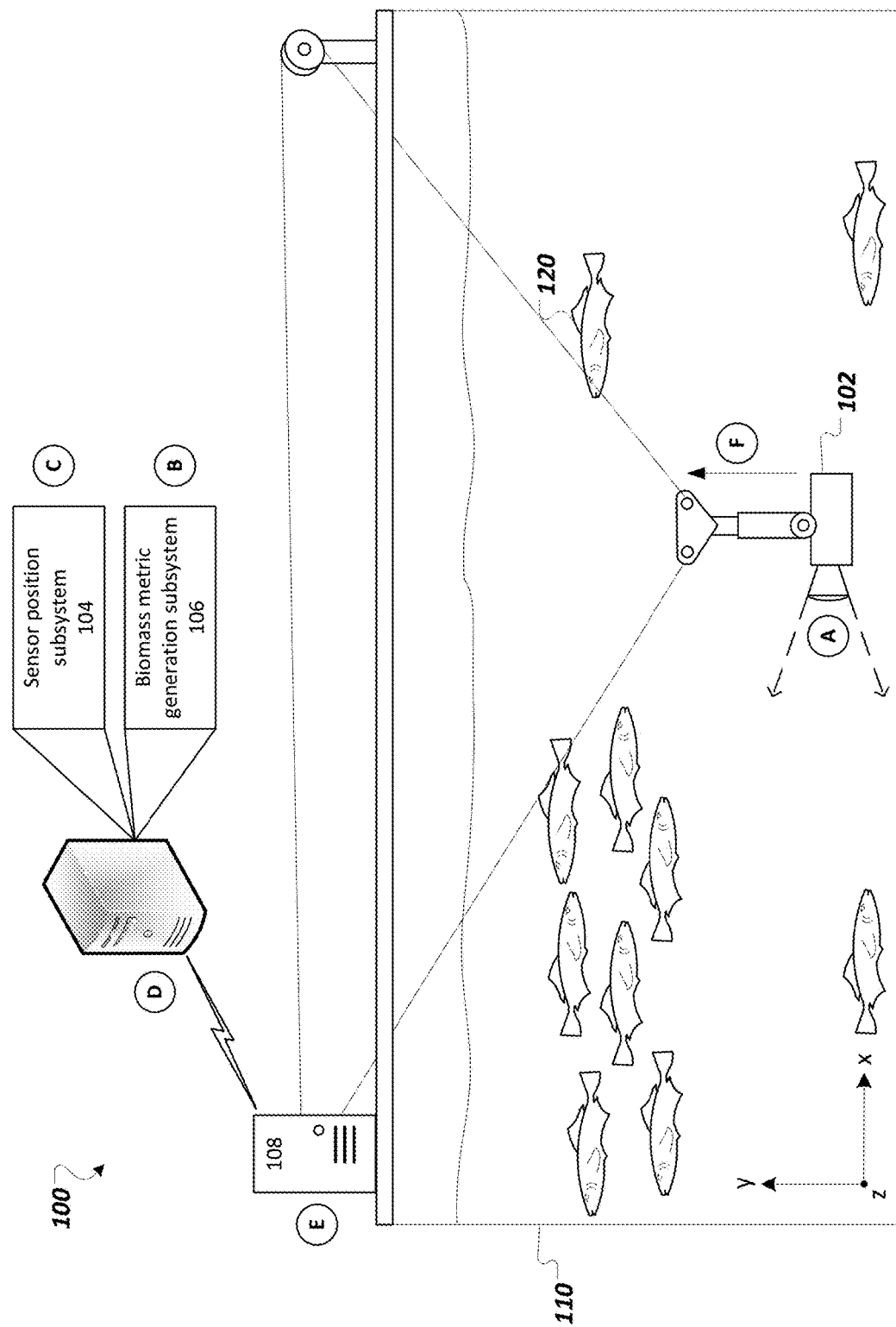
FIG. 4 is a diagram that illustrates a position change of the sensor subsystem of FIGS. 2-3 to address a scenario in which a median depth offset of the sensor subsystem is significantly biased.

FIG. 4 is a diagram that illustrates a position change of the sensor subsystem 102 to address a scenario in which a median depth offset of the sensor subsystem is significantly biased. In the example of FIG. 4, the sensor subsystem 102 includes a camera which generates visual sensor data (A).

The sensor data is communicated to the biomass metric generation subsystem 106, which generates one or more metrics using the sensor data (B). For example, the biomass metric generation subsystem 106 can generate a metric corresponding to the median depth offset of the livestock.

The one or more metrics generated in stage (B) are communicated to the sensor position subsystem 104, which determines, using the metrics, that the median depth offset of the livestock is significantly biased (C). For example, the sensor position subsystem 104 can compare the median depth offset metric generated in stage (B) to a current depth of the sensor subsystem 102 to determine the bias (e.g., the difference between the median depth offset and the current depth of the sensor subsystem). If the median depth offset bias is larger than or equal to a threshold depth bias value, then the sensor position subsystem 104 can determine that an instruction to move the sensor subsystem 102 is to be generated.

The sensor position subsystem 104 determines an instruction corresponding to a movement of the sensor subsystem 102 and communicates the instruction to the winch subsystem 108 (D). The median depth offset metric can be a signed value to indicate whether the livestock is substantially above the sensor subsystem 102 or substantially below the sensor subsystem. In the example of FIG. 4, the sign of the median depth offset metric indicates that the livestock is substantially above the sensor subsystem 102. The instruction is for changing the vertical position, or depth, of the sensor subsystem 102 in response to the median depth offset being significantly biased from the current depth of the sensor subsystem 102.

The winch subsystem 108 receives the instruction from the sensor control subsystem 104 and activates one or more motors to perform the instruction (E). The sensor subsystem 102 ascends in the y-direction (F). As shown in FIG. 4, the livestock is mainly located towards the surface of the water of the enclosure 110, therefore, raising the sensor subsystem 102 allows the sensor subsystem to better generate sensor data of the livestock.

Figure 5:
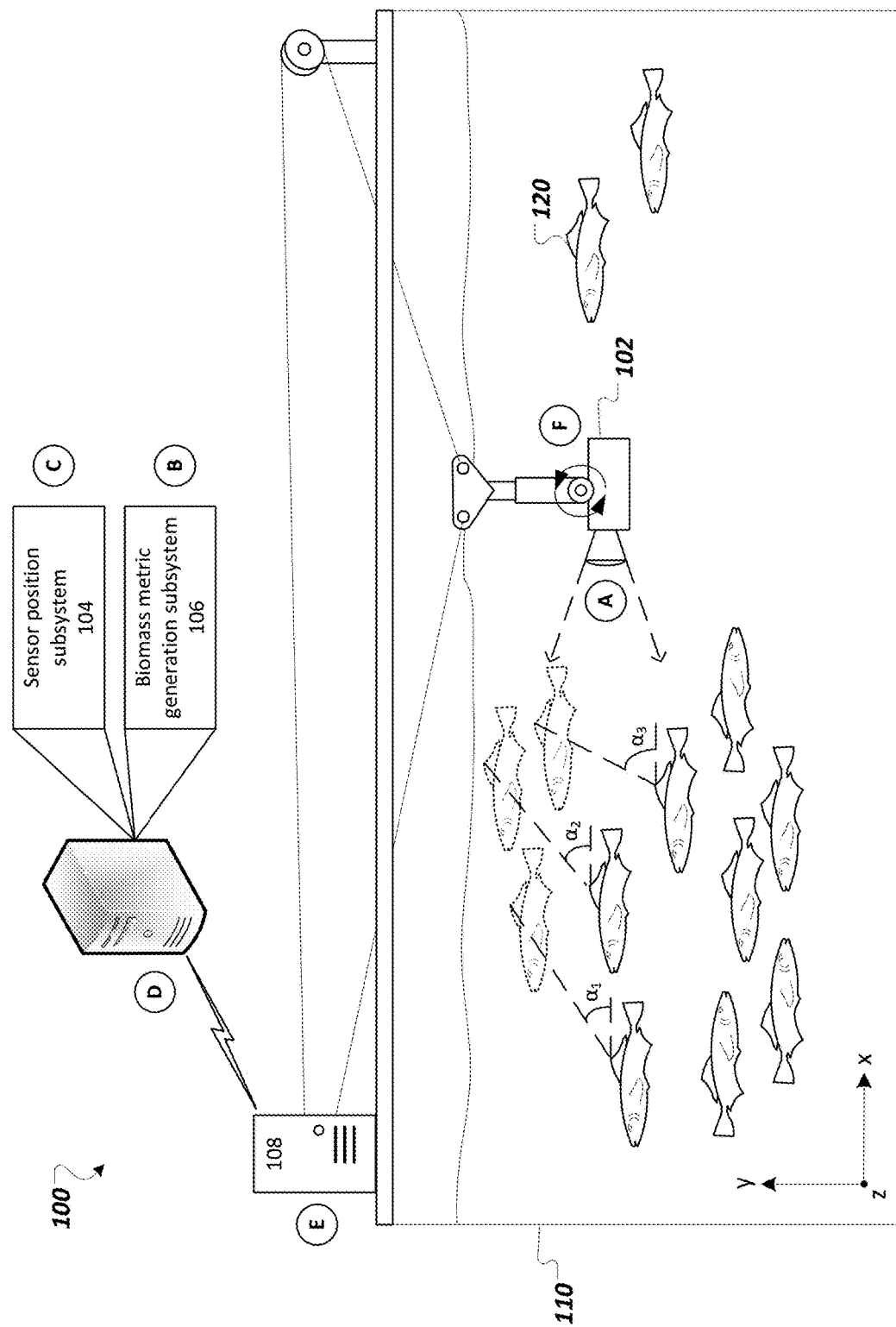
FIG. 5 is a diagram that illustrates a change in a vertical angle of the sensor subsystem of FIGS. 2-4 to address a scenario in which a median livestock track angle is significantly biased.

FIG. 5 is a diagram that illustrates a change in a vertical angle of the sensor subsystem 102 to address a scenario in which the median livestock track angle is significantly biased. In the example of FIG. 5, the sensor subsystem 102 includes a camera which generates visual sensor data (A).

The sensor data is communicated to the biomass metric generation subsystem 106, which generates one or more metrics using the sensor data (B). For example, the biomass metric generation subsystem 106 can generate a metric corresponding to the median livestock track angle. For example, the biomass metric generation system can generate track angles $\alpha_1$, $\alpha_2$, and $\alpha_3$, using the initial positions of three fish (shown in dotted lines) and the final positions of the three fish. Each fish and track angle $\alpha_1$, $\alpha_2$, and $\alpha_3$ is associated with a different track shown using dashed lines that extends from the top fin of each fish when it's at its initial position to the top fin when it's at its final position. The median track angle can be the median value of the three track angles $\alpha_1$, $\alpha_2$, and $\alpha_3$.

The one or more metrics generated in stage (B) are communicated to the sensor position subsystem 104, which determines, using the metrics, that the livestock track angle is significantly biased (C). For example, the sensor position subsystem 104 can determine whether the median livestock track angle metric generated in stage (B) is greater than a threshold livestock track angle. If the median livestock track angle is larger than or equal to a threshold livestock track angle, then the livestock track angle is significantly biased and the sensor position subsystem 104 can determine that an instruction to change the horizontal or vertical angle of the sensor subsystem 102 is to be generated.

In some implementations, the sensor position subsystem 104 can determine whether the difference between the median livestock track angle and the horizontal angle of the sensor subsystem 102 or the difference between the median livestock track angle and the vertical angle of the sensor subsystem is greater than or equal to a threshold difference. If the difference between the median livestock track angle and the horizontal or vertical angle is greater than or equal to a threshold difference, the sensor position subsystem 104 can determine that an instruction to change the horizontal or vertical angle of the sensor subsystem 102 is to be generated.

The sensor position subsystem 104 determines an instruction corresponding to a movement of the sensor subsystem 102 and communicates the instruction to the winch subsystem 108 (D). In the example of FIG. 5, the median livestock track angle indicates that the fish are moving downwards in the y-direction (e.g., that the median livestock track angle is significantly biased). Because the viewing angle of the sensor subsystem 102 is approximately in line with the x-axis, the sensor subsystem may be pointed above the positions of the fish that are moving downwards in the y-direction. Therefore, the instruction determined by the sensor position subsystem 104 is for changing the vertical angle of the sensor subsystem 102 in response to the median livestock track angle being significantly biased.

The winch subsystem 108 receives the instruction from the sensor control subsystem 104 and activates one or more motors to perform the instruction (E). The sensor subsystem 102 rotates, as indicated by the counterclockwise arrows of FIG. 5, changing the vertical angle of the sensor subsystem (F). As shown in FIG. 5, changing the vertical angle of the sensor subsystem 102 allows the sensor subsystem to better generate sensor data of the livestock that are located below the sensor subsystem.

Figure 6:
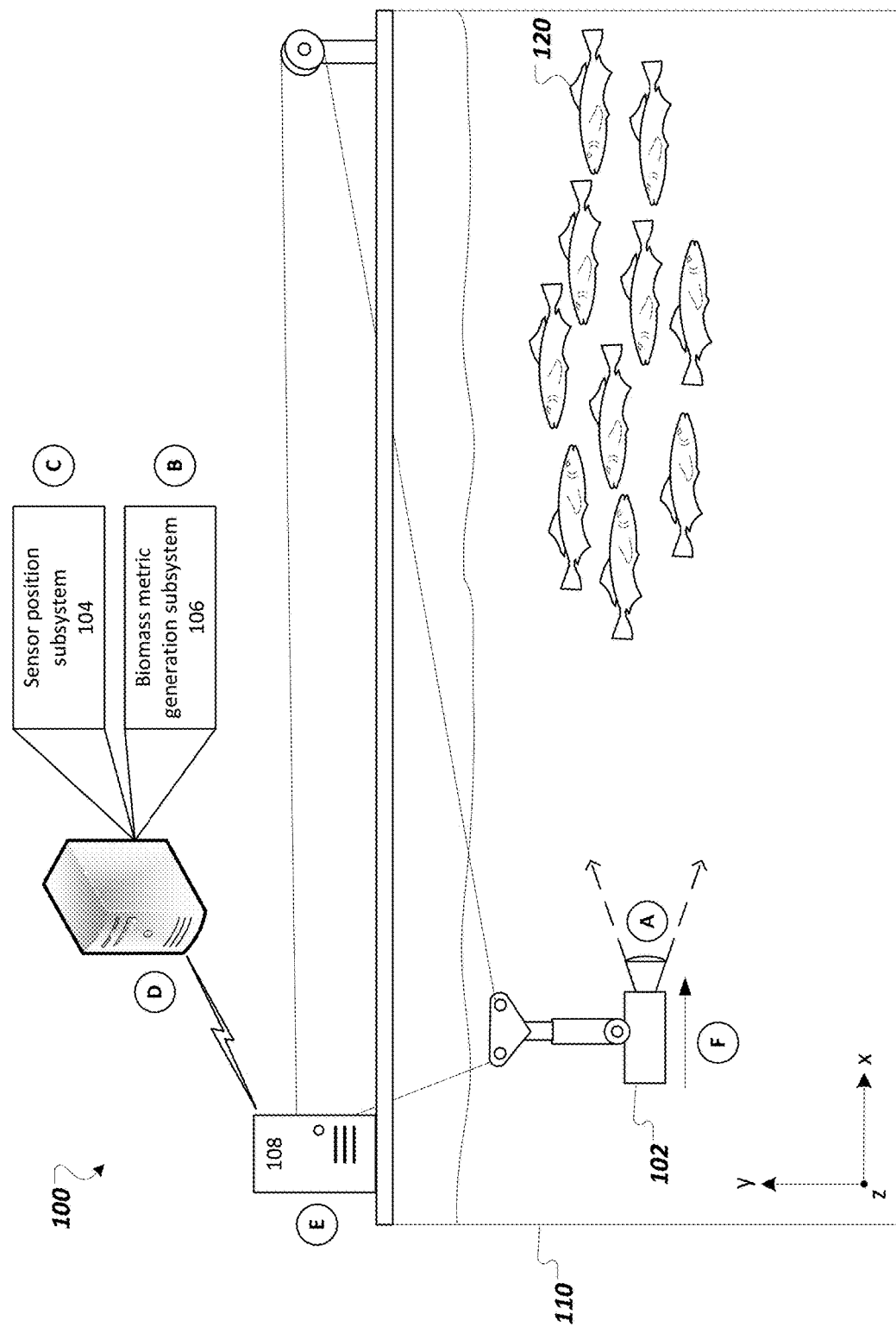
FIG. 6 is a diagram that illustrates a position change of the sensor subsystem of FIGS. 2-5 in which a horizontal distance to the livestock is decreased.

FIG. 6 is a diagram that illustrates a position change of the sensor subsystem 102 in which a horizontal distance to the livestock is decreased. In the example of FIG. 6, the sensor subsystem 102 includes a camera which generates visual sensor data (A).

The sensor data is communicated to the biomass metric generation subsystem 106, which generates one or more metrics using the sensor data (B). For example, the biomass metric generation subsystem 106 can generate a metric corresponding to the median horizontal distance to the livestock. As another example, the biomass metric generation subsystem 106 can generate a metric corresponding to the number of stereo matched livestock tracks.

The one or more metrics generated in stage (B) are communicated to the sensor position subsystem 104, which determines, using the metrics, if the horizontal distance to the livestock is to be updated (C). If the median horizontal distance to the livestock is greater than or equal to an upper threshold horizontal distance, then the sensor position subsystem 104 can determine that an instruction to move the sensor subsystem 102 is to be generated. Alternatively, or in addition, if the number of stereo matched livestock tracks is less than a threshold number of livestock object tracks, then the sensor position subsystem 104 can determine that an instruction to move the sensor subsystem 102 is to be generated.

The sensor position subsystem 104 determines an instruction corresponding to a movement of the sensor subsystem 102 and communicates the instruction to the winch subsystem 108 (D). In the example of FIG. 6, the magnitude of the median horizontal distance metric indicates that the horizontal distance to the livestock may be too great for the sensor subsystem 102 to generate quality sensor data of the livestock. The instruction determined by the sensor position subsystem 104 is for changing the horizontal position of the sensor subsystem 102 in response to the median horizontal distance to the livestock being greater than or equal to the upper threshold horizontal distance.

The winch subsystem 108 receives the instruction from the sensor control subsystem 104 and activates one or more motors to perform the instruction (E). The sensor subsystem 102 moves in the x-direction (F). As shown in FIG. 6, the livestock is mainly located far to the right of the sensor subsystem 102, therefore, moving the sensor subsystem in the x-direction allows the sensor subsystem to better generate sensor data of the livestock.

Figure 7:
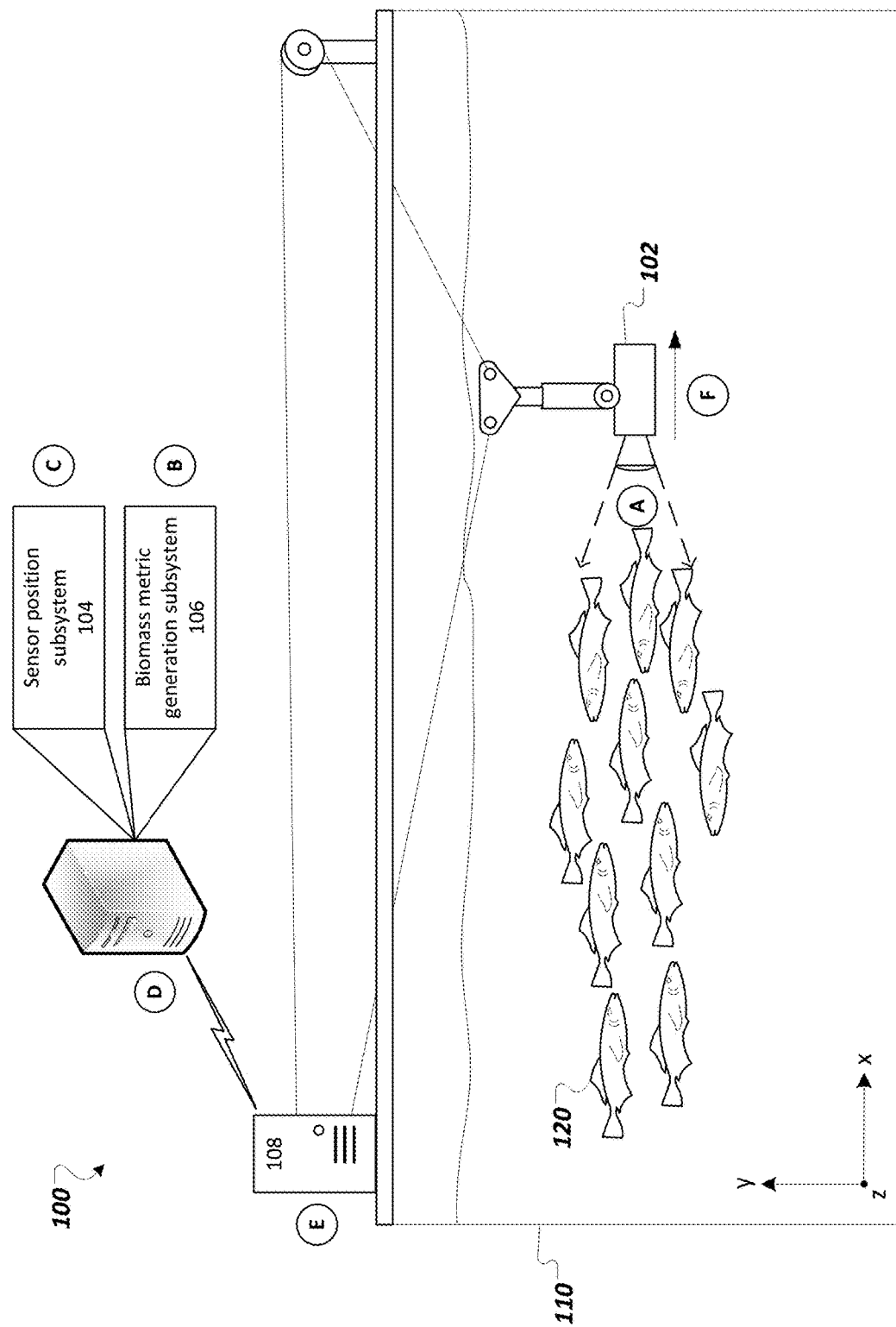
FIG. 7 is a diagram that illustrates a position change of the sensor subsystem of FIGS. 2-6 in which a horizontal distance to the livestock is increased.

FIG. 7 is a diagram that illustrates a position change of the sensor subsystem 102 in which a horizontal distance to the livestock is increased. In the example of FIG. 7, the sensor subsystem 102 includes a camera which generates visual sensor data (A).

The sensor data is communicated to the biomass metric generation subsystem 106, which generates one or more metrics using the sensor data (B). For example, the biomass metric generation subsystem 106 can generate a metric corresponding to the median horizontal distance to the livestock. As another example, the biomass metric generation subsystem 106 can generate a metric corresponding to the median object track duration of the livestock. As yet another example, the biomass metric generation subsystem 106 can generate a metric corresponding to the number of stereo matched livestock tracks.

The one or more metrics generated in stage (B) are communicated to the sensor position subsystem 104, which determines, using the metrics, if the horizontal distance to the livestock is to be updated (C). If the median horizontal distance to the livestock is less than or equal to a lower threshold horizontal distance or if the median object track duration is less than or equal to a threshold track duration or if the number of stereo matched livestock tracks is less than a threshold number of livestock object tracks, then the sensor position subsystem 104 can determine that an instruction to move the sensor subsystem 102 is to be generated.

The sensor position subsystem 104 determines an instruction corresponding to a movement of the sensor subsystem 102 and communicates the instruction to the winch subsystem 108 (D). In the example of FIG. 7, the magnitude of the median horizontal distance metric may indicate that the horizontal distance to the livestock may be too small for the sensor subsystem 102 to generate quality sensor data of the livestock. Alternatively, or in addition, the magnitude of the median object track duration metric may indicate that the horizontal distance to the livestock may be too small for the sensor subsystem 102 to generate quality sensor data of the livestock. Alternatively, or in addition, the magnitude of the stereo matched object track metric may indicate that the horizontal distance to the livestock may be too small for the sensor subsystem 102 to generate quality sensor data of the livestock. The instruction determined by the sensor position subsystem 104 is for changing the horizontal position of the sensor subsystem 102 in response to the magnitude of the median horizontal distance metric and/or the magnitude of the median object track duration metric and/or the magnitude of the stereo matched object rack metric.

The winch subsystem 108 receives the instruction from the sensor control subsystem 104 and activates one or more motors to perform the instruction (E). The sensor subsystem 102 moves in the x-direction (F). As shown in FIG. 7, most of the fish are located close to the sensor subsystem 102, therefore, moving the sensor subsystem in the x-direction allows the sensor subsystem to better generate sensor data of the livestock.

In some implementations, the biomass monitoring system 100 can include an absolute pressure sensor, a sonar sensor, a laser range finder, water temperature sensor, and ambient light sensors, among other sensors. The biomass monitoring system 100 can use the data from these sensors, such as the absolute pressure sensor or sonar, to measure the distance from the sensor subsystem 102 to the water's surface. Additionally, data from the sonar sensor can be used to measure the distance from the sensor system 102 to the bottom of the enclosure 110. In some implementations, data from the sonar sensor, the laser range finder, and the absolute pressure sensor can be used to determine the location of the sensor system 102.

In some implementations, the biomass monitoring system 100 can perform distance measurements between the sensor subsystem 102 and the other elements within the enclosure 110. For example, the biomass monitoring system 100 can use data from a sonar sensor, data from a laser range finder, and data from a camera to determine a distance of the sensor subsystem 102 to other objects within the enclosure 110. The biomass monitoring system 100 can reconstruct images from a stereo camera of the sensor subsystem 102 using techniques, such as, for example, stereophotogrammetry. Stereophotogrammetry involves estimating three-dimensional coordinates of points of an object employing measurements made in two or more photographic images taken from different positions.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the invention have been described. Other embodiments are within the scope of the following claims. For example, the steps recited in the claims can be performed in a different order and still achieve desirable results.

What is claimed is:

1. A method performed by a biomass monitoring system, the method comprising:
   receiving one or more metrics representing one or more characteristics of livestock, including one or more livestock objects, contained in an enclosure and monitored by one or more sensors coupled to a winch subsystem,
   wherein receiving the one or more metrics representing the one or more characteristics of the livestock includes determining a median distance from the one or more sensors to the livestock, the median distance corresponding to a median value of each distance from each of the one or more livestock objects to the one or more sensors;
   determining that the median distance is greater than or equal to an upper threshold median distance;
   based on determining that the median distance is greater than or equal to the upper threshold median distance, determining a position to move the one or more sensors;
   determining an instruction that comprises information related to a movement of the one or more sensors, wherein the information of the instruction relates to moving the one or more sensors closer to the livestock; and
   sending the instruction to the winch subsystem to change the position of the one or more sensors.

2. The method of claim 1, wherein the one or more metrics includes a number of individual livestock object detections, a number of stereo matched livestock tracks, a median depth offset of the livestock, a median object track duration of the livestock, or a median livestock track angle.

3. The method of claim 1, further comprising:
   receiving sensor data from the one or more sensors; and
   generating, using the sensor data, the one or more metrics.

4. The method of claim 1, further comprising:
   receiving, by the winch subsystem, the instructions; and
   changing, by the winch subsystem, the position of the one or more sensors according to the instructions.

5. The method of claim 1, further comprising:
   determining an approximate number of livestock objects of the livestock;
   determining that the approximate number of livestock objects is less than a threshold number of livestock objects; and
   wherein the information of the instruction relates to a change in position of the one or more sensors from a first depth within the enclosure to a second depth within the enclosure.

6. The method of claim 1, further comprising:
   determining a first depth within the enclosure of the one or more sensors;
   calculating a depth offset value being a difference between the first depth and a reference depth within the enclosure of the one or more sensors;
   determining that the depth offset value is greater than or equal to a threshold depth offset value; and
   wherein the information of the instruction relates to a change in position of the one or more sensors from the first depth within the enclosure to a second depth within the enclosure.

7. The method of claim 1, further comprising:
   determining a first depth within the enclosure of the one or more sensors;
   calculating a depth offset value being a difference between the first depth and a reference depth within the enclosure of the one or more sensors;
   determining that the depth offset value is greater than or equal to a threshold depth offset value; and
   wherein the information of the instruction relates to a change in position of the one or more sensors from the first depth within the enclosure to a second depth within the enclosure.

8. The method of claim 1, further comprising:
   determining a median track angle of the livestock, the median track angle corresponding to a median value of one or more angles formed between a track of one or more livestock objects and a horizontal line;
   determining that the median track angle of the livestock is greater than or equal to a threshold track offset value; and
   wherein the information of the instruction relates to a change in an angle of the winch subsystem from an initial angle to an updated angle.

9. The method of claim 1, further comprising:
   determining a median distance from the one or more sensors to the livestock, the median distance corresponding to a median value of each distance from each of the one or more livestock objects to the one or more sensors; and
   determining that the median distance is less than or equal to a lower threshold median distance;
   wherein the information of the instruction relates to moving the one or more sensors farther from the livestock.

10. The method of claim 1, further comprising generating, using the metrics, a belief matrix comprising a plurality of entries each representing a likelihood of livestock being at a certain location within the enclosure.

11. The method of claim 10, wherein the belief matrix further comprises, for each of the likelihoods of the plurality of entries, a confidence score for the likelihood.

12. The method of claim 10, wherein the information of the instruction relates to moving the one or more sensors to a particular location within the enclosure that corresponds to a particular entry of the belief matrix the particular location having the greatest likelihood of livestock being present at the particular location compared to other locations within the enclosure.

13. The method of claim 1, wherein the one or more sensors include a camera, an IR sensor, a UV sensor, a temperature sensor, a pressure sensor, a hydrophone, a water current sensor, or a water quality sensor such as one that detects oxygen saturation or an amount of a dissolved solid.

14. The method of claim 1, wherein the characteristics of the livestock include being hungry, sick, hurt, or dead.

15. A biomass monitoring system comprising:
    one or more computers and one or more storage devices storing instructions that are operable, when executed by the one or more computers, to cause the one or more computers to perform operations comprising:

receiving one or more metrics representing one or more characteristics of livestock, including one or more livestock objects, contained in an enclosure and monitored by one or more sensors coupled to a winch subsystem, wherein receiving the one or more metrics representing the one or more characteristics of the livestock includes determining a median distance from the one or more sensors to the livestock, the median distance corresponding to a median value of each distance from each of the one or more livestock objects to the one or more sensors;

determining that the median distance is greater than or equal to an upper threshold median distance;

based on determining that the median distance is greater than or equal to the upper threshold median distance, determining a position to move the one or more sensors;

determining an instruction that comprises information related to a movement of the one or more sensors, wherein the information of the instruction relates to moving the one or more sensors closer to the livestock; and sending the instruction to the winch subsystem to change the position of the one or more sensors.

16. The system of claim 15, wherein the one or more sensors include a camera, an IR sensor, a UV sensor, a temperature sensor, a pressure sensor, a hydrophone, a water current sensor, or a water quality sensor such as one that detects oxygen saturation or an amount of a dissolved solid.

17. The system of claim 15, the operations further comprising:
receiving, by the winch subsystem, the instructions; and
changing, by the winch subsystem, the position of the one or more sensors according to the instructions.

18. The system of claim 15, the operations further comprising:
receiving sensor data from the one or more sensors; and
generating, using the sensor data, the one or more metrics.

19. A non-transitory computer-readable medium storing software comprising instructions executable by one or more computers which, upon such execution, cause the one or more computers to perform operations comprising:

receiving one or more metrics representing one or more characteristics of livestock, including one or more livestock objects, contained in an enclosure and monitored by one or more sensors coupled to a winch subsystem, wherein receiving the one or more metrics representing the one or more characteristics of the livestock includes determining a median distance from the one or more sensors to the livestock, the median distance corresponding to a median value of each distance from each of the one or more livestock objects to the one or more sensors;

determining that the median distance is greater than or equal to an upper threshold median distance;

based on determining that the median distance is greater than or equal to the upper threshold median distance, determining a position to move the one or more sensors;

determining an instruction that comprises information related to a movement of the one or more sensors, wherein the information of the instruction relates to moving the one or more sensors closer to the livestock; and sending the instruction to the winch subsystem to change the position of the one or more sensors.

20. The medium of claim 19, wherein the one or more sensors include a camera, an IR sensor, a UV sensor, a temperature sensor, a pressure sensor, a hydrophone, a water current sensor, or a water quality sensor such as one that detects oxygen saturation or an amount of a dissolved solid.

21. The medium of claim 19, the operations further comprising:
receiving, by the winch subsystem, the instructions; and
changing, by the winch subsystem, the position of the one or more sensors according to the instructions.

22. The medium of claim 19, the operations further comprising:
receiving sensor data from the one or more sensors; and
generating, using the sensor data, the one or more metrics.

23. A method performed by a biomass monitoring system, the method comprising:

receiving one or more metrics representing one or more characteristics of livestock, including one or more livestock objects, contained in an enclosure and monitored by one or more sensors coupled to a winch subsystem, wherein receiving the one or more metrics representing the one or more characteristics of the livestock includes determining a median distance from the one or more sensors to the livestock, the median distance corresponding to a median value of each distance from each of the one or more livestock objects to the one or more sensors;

based on determining that the median distance is less than or equal to the lower threshold median distance, determining a position to move the one or more sensors;

determining an instruction that comprises information related to a movement of the one or more sensors, wherein the information of the instruction relates to moving the one or more sensors farther from the livestock; and sending the instruction to the winch subsystem to change the position of the one or more sensors.

24. The method of claim 23, wherein the one or more sensors include a camera, an IR sensor, a UV sensor, a temperature sensor, a pressure sensor, a hydrophone, a water current sensor, or a water quality sensor such as one that detects oxygen saturation or an amount of a dissolved solid.

25. The method of claim 23, further comprising:
receiving, by the winch subsystem, the instructions; and
changing, by the winch subsystem, the position of the one or more sensors according to the instructions.

26. The method of claim 23, further comprising:
receiving sensor data from the one or more sensors; and
generating, using the sensor data, the one or more metrics.

27. A biomass monitoring system comprising:
receiving one or more metrics representing one or more characteristics of livestock, including one or more livestock objects, contained in an enclosure and monitored by one or more sensors coupled to a winch subsystem, wherein receiving the one or more metrics representing the one or more characteristics of the livestock includes determining a median distance from the one or more sensors to the livestock, the median distance corresponding to a median value of each distance from each of the one or more livestock objects to the one or more sensors;

based on determining that the median distance is less than or equal to the lower threshold median distance, determining a position to move the one or more sensors;

determining an instruction that comprises information related to a movement of the one or more sensors, wherein the information of the instruction relates to moving the one or more sensors farther from the livestock; and sending the instruction to the winch subsystem to change the position of the one or more sensors.

28. The system of claim 27, wherein the one or more sensors include a camera, an IR sensor, a UV sensor, a temperature sensor, a pressure sensor, a hydrophone, a water current sensor, or a water quality sensor such as one that detects oxygen saturation or an amount of a dissolved solid.

29. The system of claim 27, further comprising:
receiving, by the winch subsystem, the instructions; and
changing, by the winch subsystem, the position of the one or more sensors according to the instructions.

30. The system of claim 27, the operations further comprising:
receiving sensor data from the one or more sensors; and
generating, using the sensor data, the one or more metrics.

31. A non-transitory computer-readable medium storing software comprising instructions executable by one or more computers which, upon such execution, cause the one or more computers to perform operations comprising:
receiving one or more metrics representing one or more characteristics of livestock, including one or more livestock objects, contained in an enclosure and monitored by one or more sensors coupled to a winch subsystem,
wherein receiving the one or more metrics representing the one or more characteristics of the livestock includes determining a median distance from the one or more sensors to the livestock, the median distance corresponding to a median value of each distance from each of the one or more livestock objects to the one or more sensors;
based on determining that the median distance is less than or equal to the lower threshold median distance, determining a position to move the one or more sensors;
determining an instruction that comprises information related to a movement of the one or more sensors, wherein the information of the instruction relates to moving the one or more sensors farther from the livestock; and
sending the instruction to the winch subsystem to change the position of the one or more sensors.

32. The medium of claim 31, wherein the one or more sensors include a camera, an IR sensor, a UV sensor, a temperature sensor, a pressure sensor, a hydrophone, a water current sensor, or a water quality sensor such as one that detects oxygen saturation or an amount of a dissolved solid.

33. The medium of claim 31, further comprising:
receiving, by the winch subsystem, the instructions; and
changing, by the winch subsystem, the position of the one or more sensors according to the instructions.

34. The medium of claim 31, the operations further comprising:
receiving sensor data from the one or more sensors; and
generating, using the sensor data, the one or more metrics.

35. A method performed by a biomass monitoring system, the method comprising:
receiving one or more metrics representing one or more characteristics of livestock, including one or more livestock objects, contained in an enclosure and monitored by one or more sensors coupled to a winch subsystem,
wherein receiving the one or more metrics representing the one or more characteristics of the livestock includes determining a median track angle of the livestock, the median track angle corresponding to a median value of one or more angles formed between a track of the one or more livestock objects and a horizontal line;
determining that the median track angle of the livestock is greater than or equal to a threshold track offset value;
based on determining that the median track angle of the livestock is greater than or equal to the threshold track offset value, determining a position to move the one or more sensors;
determining an instruction that comprises information related to a movement of the one or more sensors, wherein the information of the instruction relates to a change in an angle of the winch subsystem from an initial angle to an updated angle; and
sending the instruction to the winch subsystem to change the position of the one or more sensors.

36. The method of claim 35, wherein the one or more sensors include a camera, an IR sensor, a UV sensor, a temperature sensor, a pressure sensor, a hydrophone, a water current sensor, or a water quality sensor such as one that detects oxygen saturation or an amount of a dissolved solid.

37. The method of claim 35, further comprising:
receiving, by the winch subsystem, the instructions; and
changing, by the winch subsystem, the position of the one or more sensors according to the instructions.

38. The method of claim 35, further comprising:
receiving sensor data from the one or more sensors; and
generating, using the sensor data, the one or more metrics.

39. A biomass monitoring system comprising:
receiving one or more metrics representing one or more characteristics of livestock, including one or more livestock objects, contained in an enclosure and monitored by one or more sensors coupled to a winch subsystem,
wherein receiving the one or more metrics representing the one or more characteristics of the livestock includes determining a median track angle of the livestock, the median track angle corresponding to a median value of one or more angles formed between a track of the one or more livestock objects and a horizontal line;
determining that the median track angle of the livestock is greater than or equal to a threshold track offset value;
based on determining that the median track angle of the livestock is greater than or equal to the threshold track offset value, determining a position to move the one or more sensors;
determining an instruction that comprises information related to a movement of the one or more sensors, wherein the information of the instruction relates to a change in an angle of the winch subsystem from an initial angle to an updated angle; and
sending the instruction to the winch subsystem to change the position of the one or more sensors.

40. The system of claim 39, wherein the one or more sensors include a camera, an IR sensor, a UV sensor, a temperature sensor, a pressure sensor, a hydrophone, a water current sensor, or a water quality sensor such as one that detects oxygen saturation or an amount of a dissolved solid.

41. The system of claim 39, the operations further comprising:
receiving, by the winch subsystem, the instructions; and
changing, by the winch subsystem, the position of the one or more sensors according to the instructions.

42. The system of claim 39, the operations further comprising:
receiving sensor data from the one or more sensors; and
generating, using the sensor data, the one or more metrics.

43. A non-transitory computer-readable medium storing software comprising instructions executable by one or more computers which, upon such execution, cause the one or more computers to perform operations comprising:
receiving one or more metrics representing one or more characteristics of livestock, including one or more livestock objects, contained in an enclosure and monitored by one or more sensors coupled to a winch subsystem,
wherein receiving the one or more metrics representing the one or more characteristics of the livestock includes determining a median track angle of the livestock, the median track angle corresponding to a median value of one or more angles formed between a track of the one or more livestock objects and a horizontal line;
determining that the median track angle of the livestock is greater than or equal to a threshold track offset value;
based on determining that the median track angle of the livestock is greater than or equal to the threshold track offset value, determining a position to move the one or more sensors;
determining an instruction that comprises information related to a movement of the one or more sensors, wherein the information of the instruction relates to a change in an angle of the winch subsystem from an initial angle to an updated angle; and
sending the instruction to the winch subsystem to change the position of the one or more sensors.

44. The medium of claim 43, wherein the one or more sensors include a camera, an IR sensor, a UV sensor, a temperature sensor, a pressure sensor, a hydrophone, a water current sensor, or a water quality sensor such as one that detects oxygen saturation or an amount of a dissolved solid.

45. The medium of claim 43, the operations further comprising:
receiving, by the winch subsystem, the instructions; and
changing, by the winch subsystem, the position of the one or more sensors according to the instructions.

46. The medium of claim 43, the operations further comprising:
receiving sensor data from the one or more sensors; and
generating, using the sensor data, the one or more metrics.

* * * * *